(12) United States Patent
Dietz et al.

(10) Patent No.: US 7,298,961 B2
(45) Date of Patent: Nov. 20, 2007

(54) PORTABLE VIDEO RECORDING DEVICE FOR BOTH CONVERTING VIDEO CASSETTE RECORDERS (VCR) TO DIGITAL RECORDERS AND FOR CONVERTING VIDEO CASSETTE RECORDING CONTENT INTO STORED DIGITAL DATA

(75) Inventors: Timothy Alan Dietz, Austin, TX (US); Walid Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 10/289,791

(22) Filed: Nov. 7, 2002

(65) Prior Publication Data

US 2004/0091233 A1  May 13, 2004

(51) Int. Cl.
*H04N 5/91* (2006.01)
*H04N 7/00* (2006.01)

(52) U.S. Cl. ........................................ 386/46
(58) Field of Classification Search .............. 386/124, 386/83, 46, 40
See application file for complete search history.

(56) References Cited

U.S. PATENT DOCUMENTS 5,055,947 A * 10/1991 Satoh .......................... 360/62
5,734,781 A * 3/1998 Cantone ....................... 386/46

OTHER PUBLICATIONS

Tape Transport, 1979, Video Technical Information, Sony Basic Video Recording Course Booklet #5, p. 21.*
Sony Basic Video Recording Course Booklet #5 Tape Transports, 1979, Video Technical Information, p. 21.*

* cited by examiner

*Primary Examiner*—Thai Q. Tran
*Assistant Examiner*—Anner Holder
(74) *Attorney, Agent, or Firm*—Julius B. Kraft; Gregory M. Doudnikoff

(57) ABSTRACT

Extending the function of a conventional VCR to both do digital recording and to convert analog tape VCR cassette recordings to a digital format without any apparatus modification of the conventional VCR. A portable video recording device comprises a video cassette housing adapted to operatively engage a video cassette recorder, i.e. the VCR requires no modification; the VCR in effect thinks that it is receiving a conventional VCR cassette. The inserted cassette housing comprises a set of read-write heads for operatively engaging an opposing set of read-write heads in the video cassette recorder; disk-drive storage apparatus operatively connected to said cassette read-write heads; and apparatus for converting analog input from the VCR to digital data and storing the data in the disk-drive storage.

6 Claims, 3 Drawing Sheets

PORTABLE VIDEO RECORDING DEVICE FOR BOTH CONVERTING VIDEO CASSETTE RECORDERS (VCR) TO DIGITAL RECORDERS AND FOR CONVERTING VIDEO CASSETTE RECORDING CONTENT INTO STORED DIGITAL DATA

TECHNICAL FIELD

The present invention relates to video recorders and, particularly, to the technological and marketplace transition of the storage of video recording content from sequential video cassette tape (usually in analog form) to non-sequential access digital storage.

BACKGROUND OF RELATED ART

The past decade has been marked by a technological revolution driven by the convergence of the data processing industry with the consumer electronics industry. An area where this relationship has been advantageous is that of digital video recording. A variety of digital recording devices have been replacing the analog VCRs (Video Cassette Recorders) that have been the video recording standard for a generation. Digital video recording has many advantages, including the ability to randomly access any portion of the digitally recorded content, higher definition video displays and longer storage life. This has resulted in the emergence of several classes of digital video recorders, such as set top boxes based upon the Personal Video Recorder (PVR). A description of the PVR and other digital video recorders and their increasing consumer functions as computer controlled "engines" in television set top boxes may be found in: *IEEE Spectrum* periodical (IEEE Inc.), New York, N.Y., July 2002, at pp. 26-31.

As is the case with each major technological advance, particularly in consumer fields, the video recording industry is faced with a conventional dilemma. All of the millions upon millions of conventional VCRs cannot be scrapped and everyone provided with a new digital device. Even if such a momentous transition were possible, what would become of presentation content presently stored in the VCR sequential tape cassettes. At the electronic entertainment field institution levels of the commercial video and film industries, this does not present a problem. There is effective higher level but expensive apparatus for making video tape content conversions to digital content. However, the personal consumer would need the means to inexpensively convert from his video cassette recorder to a digital data storage format. Even more significantly, this personal consumer would be in need of a way to inexpensively convert his personal libraries of VCR video program and presentation recordings, as well as personal video memorabilia into a digital format.

SUMMARY OF THE PRESENT INVENTION

The present invention provides the personal consumer with the means to extend the function of his VCR to do digital recording. The invention enables the personal consumer to accomplish this function without any apparatus modification of his conventional VCR.

Accordingly, the present invention provides a portable video recording device comprising a video cassette housing adapted to operatively engage a video cassette recorder, i.e. the VCR requires no modification; the VCR, in effect, thinks that it is receiving a conventional VCR cassette. The inserted cassette housing comprises a set of read-write heads for operatively engaging an opposing set of read-write heads in the video cassette recorder; disk-drive storage apparatus operatively connected to the cassette read-write heads; and apparatus for controlling said disk-drive storage apparatus to play and record video data through said video cassette recorder. While the present invention can, of course, operate with the newer VCRs that record digitally and would, therefore, provide a digital output, the cassette housing has apparatus for converting conventional VCR analog signals to digital data for storage on the disk drive. While the disk drive offers the most practical digital storage apparatus, the disk drive may be replaced by other digital storage apparatus such as PCMIA, DataPlay, Compact Flash, Smartmedia, Memory Stick and like products. The cassette housing of this invention should include a power supply for maintaining the disk drive storage apparatus.

In order for the VCR receiving the cassette housing of the present invention without any modification in the VCR, the cassette housing further includes an endless non-recordable tape adapted to engage and nest a rotating drum in the video cassette recorder including the set of read-write heads in said video cassette, said tape permitting the engagement of the set of read-write heads in the drum with the set of read-write heads in said cassette housing. While such a non-recordable endless tape is preferred, the invention may be practiced with a recordable endless tape. Such a recordable tape might be expected to have no effect on the recording or on the reading/playback. With respect to operations in the command mode for randomly accessing recorded programs for playback, these will be subject to some slight lag between commands and playback results with recordable endless tape. This command mode, which will be subsequently discussed, is not a key element of this invention.

In order to provide for playback of the stored digital data in the present cassette housing, it further includes apparatus for converting selected digital data stored in the disk drive storage apparatus back to analog data; and apparatus for applying converted analog data to the read-write heads in said recording device whereby such analog data is applied as an output signal playback to said video cassette recorder.

The present invention also provides for converting and digitally storing an analog data stream output from a video cassette recorder comprising the steps of: operatively inserting into and engaging with the video cassette recorder, a video cassette housing; and carrying out the following steps within the housing: reading the analog output from the read-write heads of the engaged video cassette recorder; converting the read analog output into digital data; and storing the digital data within said housing on disk-drive storage.

Finally, this invention provides a method of converting a video presentation stored as analog data on a video cassette to stored digital data comprising: engaging the video cassette with a video cassette recorder to thereby read the analog data by said recorder; subsequently operatively inserting into and engaging with the video cassette recorder, a video cassette housing; and carrying out the following steps within said housing: reading the analog data as output from the read-write heads of said engaged video cassette recorder; converting the read analog output into digital data; and storing the digital data within said housing on disk-drive storage.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
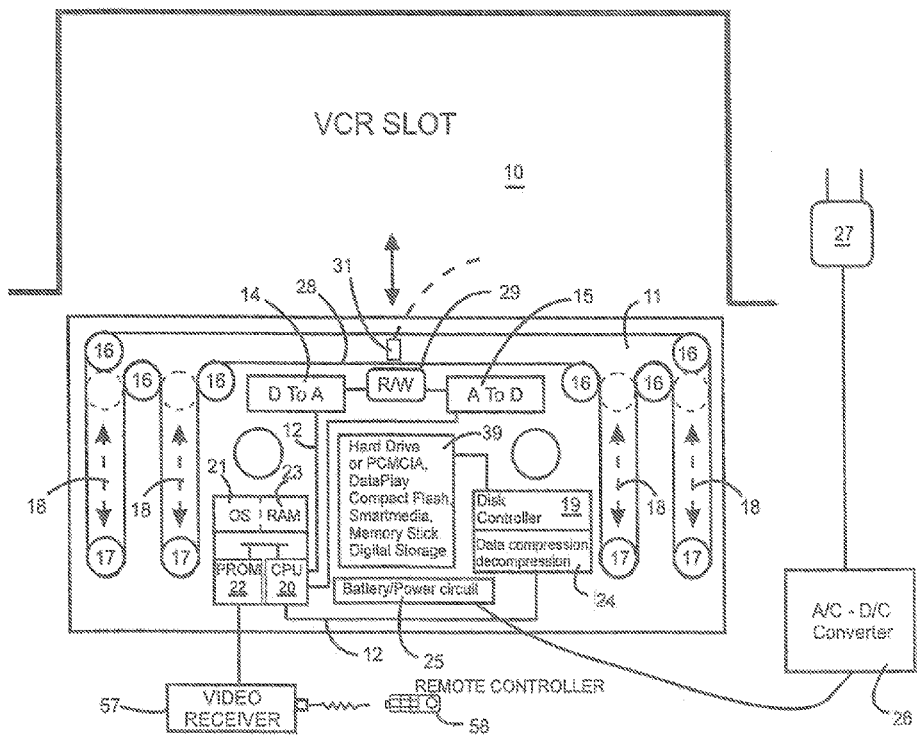
FIG. 1 is a generalized diagrammatic view of the cassette housing used in the present invention with its elements shown in the form of logical blocks.

Referring to FIG. 1, there is shown a generalized diagrammatic view of the cassette housing used in the present invention with its elements shown in the form of logical blocks. The cassette housing of this invention is a modified standard VCR cassette housing adapted to be received within a conventional VCR slot 10 in a conventional VCR (not shown). The conventional VCR thinks it is relating to a standard VCR cassette tape. The conventional VCR, as will be shown in greater detail with respect to FIG. 2, has at least two read/write heads mounted on a rotating drum, 180 degrees apart. It will be understood that the electromechanics of conventional VCRs are well understood in their field and will not be elaborated upon here except where necessary to show the VCR relationship to the cassette housing of the present invention.

The cassette 11 includes a R/W (read-write) head 29 that is mounted so as to be adjacent to the read-write head 31 of the VCR. In order that the VCR mechanism acts as though it is coacting with a conventional cassette tape, there is a relatively short endless tape 28 that could be made of an inert or even a conductive material, as will be explained in greater detail hereinafter. This endless "dummy" tape 28 is tensioned by a set of spring loaded movable rollers 17 in directions 18 against stationary roller 16 set. The operations within the cassette housing are controlled by a data processing system under the control of a central processing unit 20, that in turn is interconnected to various other components by system bus 12. An operating system 21 that runs on CPU 20 provides control and is used to coordinate the functions of the various components of the cassette system to be described. The OS 21 is stored in Random Access Memory (RAM) 23. The programs for the functions, including those of the present invention, are stored in Programmable Read Only Memory (PROM) 22, and moved into and out of RAM 23 to perform their respective functions.

The data written by VCR head 31 (that believes that it is writing on a cassette tape) goes through A to D conversion 15, and via CPU 20 control, through data compression/decompression function 24 to the disk drive adapter 19 to storage on a hard drive or disk drive 39. As set forth above, while disk drive is the convenient apparatus for digital storage, alternate digital storage devices may include PCMCIA, DataPlay, Compact Flash, Smartmedia, Memory Stick and like products. Power is provided by any conventional battery pack 25 as used in PC laptops. This may be both by-passed and recharged via wall plug 27 through A/C-D/C converter 26. The VCR may also transparently read and play the recorded material from an analog output from cassette 11 as follows. The digital data is selected by the user from digital disk drive storage 39 under the control of disk drive adapter 19, decompressed through compression/decompression function 24 and, via CPU 20, control put through D to A conversion to analog write function of head 29 that is read as an analog output signal by VCR head 31 and subsequently played on a television set through the VCR as if it were a signal from a conventional analog cassette tape.

As previously noted, the present invention permits the recorded video data to be randomly accessed. The key to this invention involves a recording device that transparently functions within a conventional video cassette recorder to digitally record the data from the VCR in a random access storage means, such as a disk drive. How this digital data is randomly accessed from the disk drive is not critical to the invention. For example, a display interface may be provided on a conventional video receiver 57. The stored digital video content may be defined as a set of identified segments in much the same manner as current CD video or audio digital recordings. The desired video segments may be selected through conventional input to commands to the video receiver through a conventional remote controller 58 via IR signals to the receiver responsive to conventional displayed dialog or menu interfaces on video receiver 57.

Figure 2:
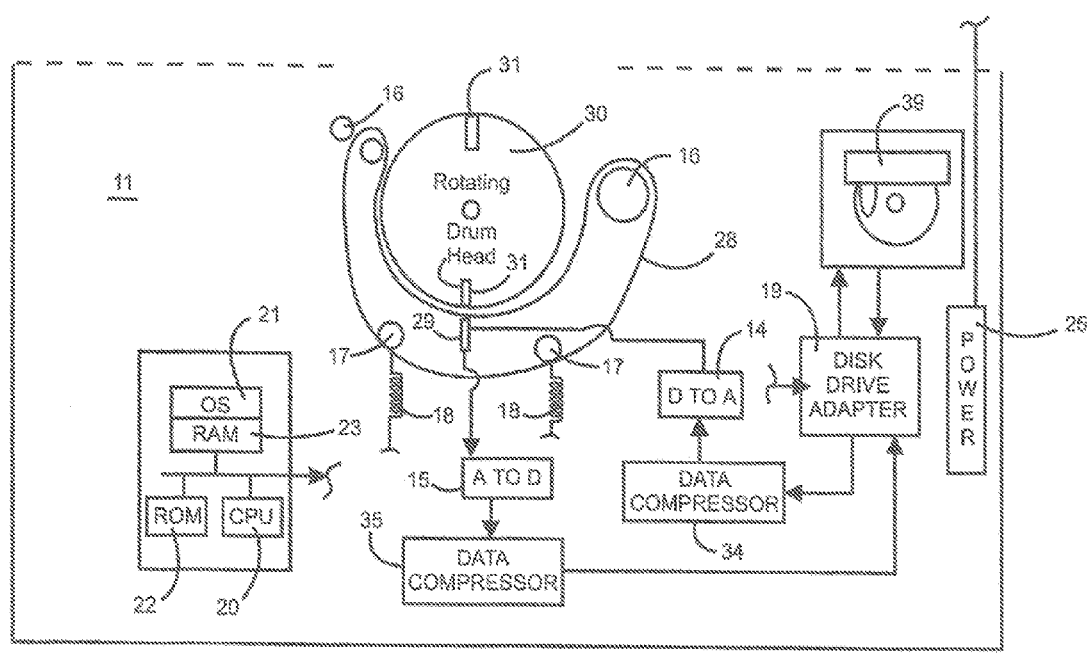
FIG. 2 is a diagrammatic view of the cassette of FIG. 1 showing the elements in a special relationship to a conventional read/write head drum of a conventional VCR; where possible, the elements in FIG. 2 are designated by the numbers assigned to equivalent elements in FIG. 1.

FIG. 2 is a diagrammatic view of the cassette of FIG. 1 showing the elements in a special relationship to a conventional read/write head drum of a conventional VCR. Where possible, the elements in FIG. 2 are designated by the numbers assigned to equivalent elements in FIG. 1. Thus, the data compression/decompression function 24 of FIG. 1 is shown as separate data compressor 35 and data decompressor 34 elements in FIG. 2. Considering the relationship of read/write head 29 in the cassette housing 11, FIG. 2, to the pair of read/write heads 31 on rotating drum 30 of the VCR, endless dummy tape 28 is shown as urged by spring 18 biased rollers 17 and rollers 16 between heads 31 and head 29 in the cassette housing 11. In the conventional VCR shown here, since the rotating drum 30 has two heads 31 on opposite sides of the drum (180 degrees apart), the two heads 31 alternate, each one would read or write every other band in a conventional VCR tape layout protocol. In such a conventional VCR layout, the video image is divided into a series of, let us say, 525 horizontal scan lines, half of which are displayed every 1/60 of a second. Each pass of the VCR rotating head on the drum reads or writes the data for one field (262.5 scan lines) of the video images if this were a true tape. Since it is not, head 29 in the cassette housing has to be dimensioned and positioned with respect to the dimensions and positions of rotating heads 31 so that it could read or write the data that the heads 31 would respectively write to or read from an actual cassette tape.

With the cassette head 29 set up with respect to VCR heads 31, adjacent but on opposite sides of dummy tape 28, the tape should be transparent to the signal but not overly conductive with respect to the signals. Any thin uncoated plastic tape material should be sufficiently transparent but not overly insulative. Alternatively, the dummy tape 28 could be diverted around heads 29 and 31 positioned very close to each other.

Figure 3:
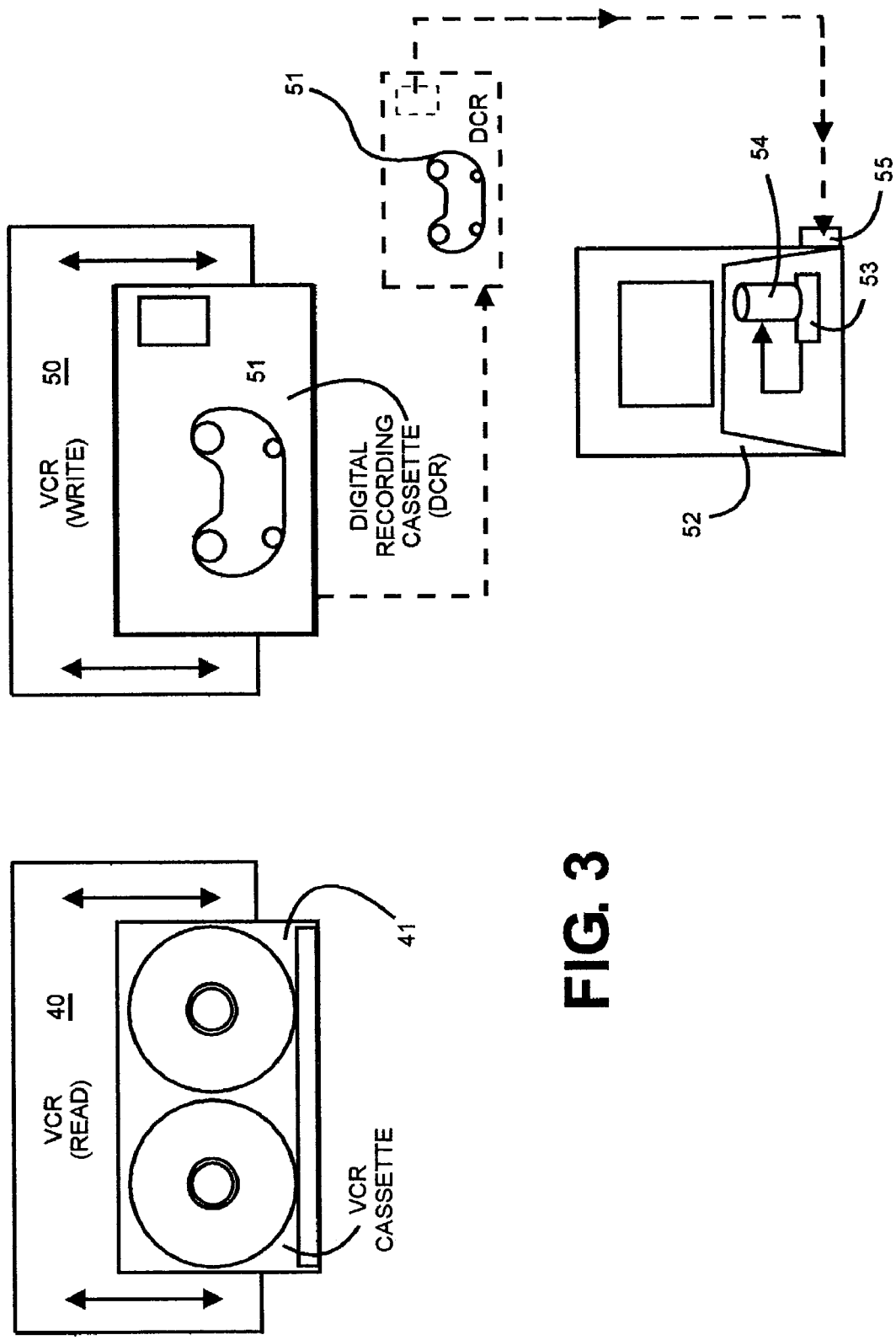
FIG. 3 is a diagram to illustrate how the elements of the present apparatus are used sequentially in a process to convert sequential analog content on a VCR cassette tape into digital data stored on a personal computer.

Now, with reference to FIG. 3, a generalized flow of a process to convert the sequential analog content on a VCR cassette tape into digital data stored on a personal computer. A conventional VCR cassette tape 41 with stored analog content is inserted and read conventionally by a VCR 40. Then, using any convenient arrangement of VCR to do conventional copying of VCR cassette tapes, the analog data read from cassette 41 is written by VCR 50, which may be a VCR separate from VCR 40, or VCRs 40 and 50 may be in a conventional double cassette (two deck) unit designed for copying. VCR 50 then writes the data content onto cassette 51 that is the conversion cassette of the present invention (DCR) 51 from which the digital data may be transferred; for example, to the disk drive 54 of personal computer 52 via disk drive adapter 53 through a conventional USB port 55.

Although certain preferred embodiments have been shown and described, it will be understood that many changes and modifications may be made therein without departing from the scope and intent of the appended claims.

What is claimed is:

1. A portable video recording device comprising a video cassette housing adapted to operatively engage a video cassette recorder, said cassette housing comprising:
    a set of read-write heads for operatively engaging an opposing set of read-write heads for analog signals in said video cassette recorder;
    disk-drive storage apparatus operatively connected to said cassette read-write heads;
    apparatus for controlling said disk-drive storage apparatus to play and record video data through said video cassette recorder;
    a converter for converting analog video data recorded from said video cassette recorder to digital data wherein said digital data may be stored in said disk drive storage apparatus;
    a power supply for maintaining said disk drive storage apparatus;
    an endless non-recordable tape adapted to engage and nest a rotating drum in the video cassette recorder including said set of read-write heads in said video cassette, said tape permitting the engagement of the set of read-write heads in said drum with the set of read-write heads in said cassette housing;
    apparatus for converting selected digital data stored in said disk drive storage apparatus back to analog data; and
    apparatus for applying converted analog data to said read-write heads in said recording device whereby such analog data is applied as an output signal playback to said video cassette recorder.

2. The portable video recording device of claim 1 wherein said set of read-write heads in said cassette housing comprises a single read-write head.

3. The portable video recording device of claim 1 further including apparatus for providing an output of selected digital data stored on said disk-drive storage apparatus.

4. In a video cassette recorder including a set of read-write heads, a removable operatively engaged video cassette housing comprising:
    a set of read-write heads for operatively engaging an opposing set of read-write heads for analog signals in said video cassette recorder;
    disk-drive storage apparatus operatively connected to said cassette read-write heads;
    apparatus for controlling said disk-drive storage apparatus to play and record video data through said video cassette recorder.
    a converter for converting analog video data recorded from said video cassette recorder to digital data wherein said digital data may be stored in said disk drive storage apparatus;
    a power supply for maintaining said disk drive storage apparatus;
    an endless non-recordable tape adapted to engage and nest a rotating drum in the video cassette recorder including said set of read-write heads in said video cassette, said tape permitting the engagement of the set of read-write heads in said drum with the set of read-write heads in said cassette housing;
    apparatus for converting selected digital data stored in said disk drive storage apparatus back to analog data; and
    apparatus for applying converted analog data to said read-write heads in said recording device whereby such analog data is applied as an output signal playback to said video cassette recorder.

5. The video cassette recorder of claim 4 wherein said set of read-write heads in said cassette housing comprise a single read-write head.

6. The video cassette recorder of claim 4 wherein said cassette housing further includes apparatus for providing an output of selected digital data stored on said disk-drive storage apparatus.

* * * * *